April 18, 1939.  R. A. TUOT  2,154,877
RAILWAY SIGNALING DEVICE
Filed March 17, 1938  3 Sheets-Sheet 1

Fig. 1

INVENTOR
RAYMOND ARTHUR TUOT
By Young, Emery & Thompson
ATTYS.

April 18, 1939.    R. A. TUOT    2,154,877
RAILWAY SIGNALING DEVICE
Filed March 17, 1938    3 Sheets-Sheet 2

Fig. 2

INVENTOR
RAYMOND ARTHUR TUOT
By Young, Emery & Thompson
ATTYS.

April 18, 1939.   R. A. TUOT   2,154,877
RAILWAY SIGNALING DEVICE
Filed March 17, 1938   3 Sheets-Sheet 3

Fig. 3

INVENTOR
RAYMOND ARTHUR TUOT
BY Young, Emery & Thompson
ATTYS.

Patented Apr. 18, 1939

2,154,877

UNITED STATES PATENT OFFICE 2,154,877

RAILWAY SIGNALING DEVICE

Raymond Arthur Tuct, Strasbourg, France, assignor of one-half to Société Auxiliaire d'Etudes Electrochniques, Strasbourg, France, and one-half to Société Suisse d'Electricté et de Traction, Basel, Switzerland Application March 17, 1938, Serial No. 196,518
In Switzerland April 21, 1937

3 Claims. (Cl. 246—67)

Electric signaling devices for railways which do not use any optical signal on the track and which comprise indicating or warning apparatus in the driver's cabin of each locomotive and in the vicinity of the important points of the track such as level crossings, cross-overs, points, stations, and the like, are already known.

These apparatus are inserted in a circuit which comprises the running track used as electric conductor and an insulated pilot conductor arranged along the track and with which one or more shoes carried by each locomotive come into contact, the locomotive carrying a direct current generator connected on the one hand to the shoes, and on the other hand to earth.

The present invention relates to improvements in devices of this kind, making their use more general and permitting them in particular to be applied to electric traction railways.

According to the invention, there is arranged on each locomotive a generator giving alternating currents of constant frequency. The exciting members of this generator are supplied by a dynamo driven proportionally to the speed of the locomotive and arranged with constant excitation so as to give an electromotive force proportional to its speed of rotation.

Under the foregoing conditions it is clear that the electromotive force of the generator itself is also proportional to the speed of travel of the locomotive, but the frequency of the alternating current produced is constant.

In the case of railways equipped for electric traction, advantage is taken of the presence of the trolley wire supplying the traction current, to obviate the necessity of a separate pilot conductor, connecting the actual apparatuses of the signaling device, that is to say, the generator and the indicators or warning devices of each machine, to one or more collecting shoes of the locomotive or of the train cooperating with the trolley wire by the intermediation of filtering circuits avoiding the reception of the traction current in the signaling device and also any loss of signaling current into the traction machines.

If the traction current is continuous, the filtering circuits may be simply constituted by a condenser accompanied if need be by a self-induction coil arranged in series and having a value suitable to the frequency of the signaling current.

In the case of alternating current traction, the frequency of the signaling current is chosen different from that of the traction current and the filtering cells may comprise circuits formed of condensers and self-induction coils tuned to the frequency of the current to be blocked, allowing nevertheless the passage of the other-current which has a different frequency.

To permit the indicators or warning devices of each locomotive to take into account only the position of the track apparatus or of the other trains located in front and to avoid the said indicators or warning devices being influenced in an undesired manner by the track apparatus or those of the train behind, there may be used on the locomotive or the train a selecting bridge comprising in the main two collecting brushes cooperating with the trolley wire and adapted to be common with those utilized for the traction current.

With each collecting brush there starts a branch signaling circuit preferably through the intermediation of a transformer. These branch circuits terminate at a measuring apparatus or a relay, of the differential type, so as only to be influenced when the current which it receives from the collecting brush located furthest in front on the trolley wire is greater than the current brought by the collecting brush located at the back.

The signaling circuit may also comprise a commutator functioning preferably with a rhythm proportional to the speed of the locomotive. This commutator is arranged so as to place the generator of the locomotive periodically out of the signaling circuit and to substitute for it a direct electric connection (for the signaling frequency) between the trolley wire and the running rail.

An example of the device according to the invention applied to an electric traction railway for monophase alternating current is shown by way of example in the annexed drawings, in which.

Figure 1:
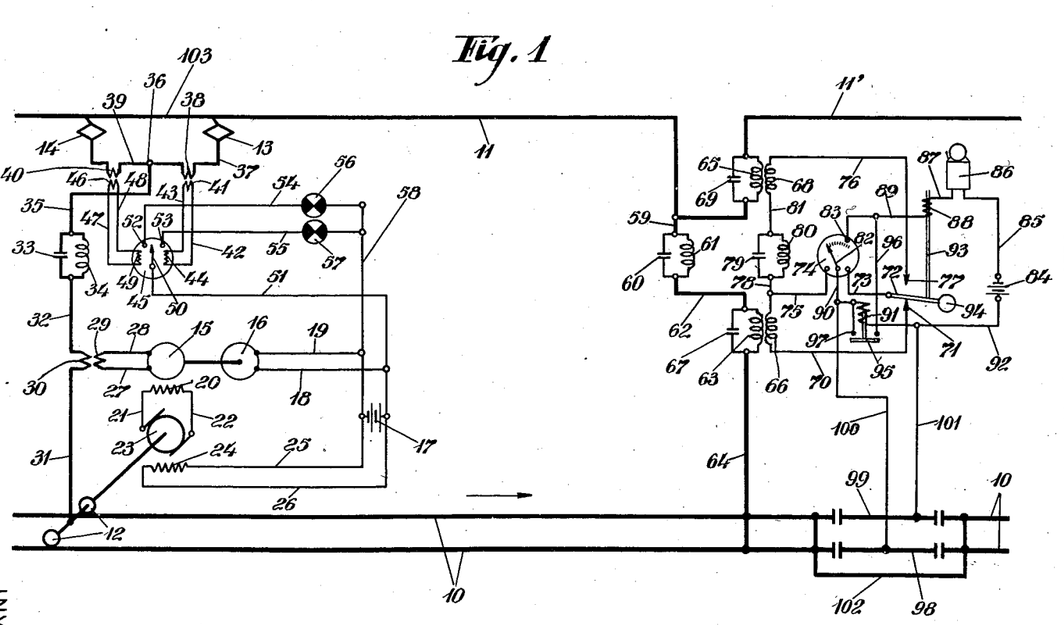
Figure 1 is a simplified diagram of the signaling device of a locomotive and a track apparatus.

Train locomotives run on the rails 10 and the left-hand side Figure 1 shows in a very simplified manner the essential parts of the signaling equipment of a locomotive.

The metallic mass of this locomotive is represented by the wheels 12 resting on the rails 10. 13 and 14 represent the two brushes cooperating with a contact rail 11 and these two brushes are separated as much as possible from each other leaving between them a portion 103 of the rail.

There is located on the locomotive an alternating current generator 15 of different frequency from the frequency of the traction current.

This generator may be designed as an alternator rotated by a motor 16 taking its supply from a source of electricity 17 through conductors 18 and 19.

The exciting member indicated by 20 of the generator 15 is supplied through conductors 21 and 22 by a continuous current dynamo 23.

The field winding 24 of the dynamo 23 is supplied in a constant manner by the source of current 16 through conductors 25 and 26.

The dynamo armature 23 is set in rotation by the wheels 12 of the locomotive, so that the electromotive force of the dynamo 23 and consequently the field current of the generator 15 are proportional to the speed of travel of the locomotive.

The terminals of the generator 15 are connected by conductors 27 and 28 to the primary 29 of a transformer the secondary 30 of which is connected by a conductor 31 to the wheels 12 of the locomotive and by a conductor 32 to a filtering circuit constituted by a condenser 33 and self-induction coil 34, connected in parallel.

The respective values of the capacity of the condenser 33 and of the self-induction of the coil 34 are arranged so as to obtain the condition of resonance for the frequency of the traction current and thus constitute a filter preventing the passage of this current.

As the frequency of the signaling current produced by the generator 15 is made different from that of the traction current, the signaling current is not blocked by the filter 33, 34.

On the other side of the filter 33, 34, is arranged a conductor 35 which terminates at 36 in two branch circuits; one 37 comprising the primary 38 of the transformer and terminating at the brush 13, whilst the other branch 39 comprises the primary 40 of another transformer and terminates at the brush 14.

The secondary 41 of the first transformer is connected by conductors 42 and 43 to one of the coils 44 of a differential galvanometer 45. In the same way, the secondary 46 of the other transformer is connected by conductors 47 and 48 to the other winding 49 of the galvanometer 45.

The movable member 50 of the galvanometer 45 is a current conductor and is connected by a conductor 51 to one of the terminals of the source 17.

In cooperation with the movable member 50, the differential galvanometer 45 comprises two contact pieces 52 and 53 which are connected by conductors 54 and 55 to indicators or warning devices 56 and 57 which are furthermore connected by a common conductor 58 to the other pole of the source 17.

The locomotive being supposed as travelling on the rails 10 in the direction of the arrow, the right-hand portion of Figure 1 is in front of the locomotive.

It is supposed that on this right-hand portion there is an important point of the track, for example, a station, and that it is necessary for the approach of a train to be signaled a certain time, which is constant, before the passage of the train at the point under consideration of the track.

At this point the trolley wire 11 is connected by a conductor 59 to a filter circuit composed of a condenser 60 and a self-induction coil 61 connected in parallel and having values so arranged as to fulfil the condition of resonance for the frequency of the traction current.

The outlet terminal of the filter 60—61 is connected to the rails 10 by a conductor 62, a self-induction coil 63 and a conductor 64.

There is also interposed on the trolley wire 11 proper a self-induction coil 65 similar to the coil 63; beyond the coil 65 the trolley wire is indicated by 11'.

In shunt to the coil 63 is a condenser 67 the value of which is so arranged as to fulfill with this coil the condition of resonance for the frequency of the signaling current; similarly the coil 65 is accompanied by a condenser 69 so as to effect resonance for the signaling current.

The coil 63 is inductively coupled with a secondary winding 66 interposed in a circuit which comprises a conductor 70, a contact piece 71 for a commutator or switch 72, a conductor 73, a galvanometer 74 and a conductor 75.

Similarly the coil 65 is inductively coupled with a secondary winding 68 inserted in a circuit which comprises a conductor 76, a contact piece 77 for the commutator 72, the conductor 73, the galvanometer 74, the conductor 75, a conductor 78, a filtering circuit constituted by a condenser 79, and a self-induction coil 80, arranged in parallel and the circuit is closed on to the secondary 68 by a conductor 81.

The respective values of the condenser 79 and of the self-induction coil 80 are fixed in such manner as to fulfil the condition of resonance for the frequency of the traction current, due to which no current of this frequency can flow in the circuit of the secondary 68.

Obviously, when the circuit of a secondary winding 66 or 68 is closed, the self-induction proper of the coil 63 or 65 corresponding thereto becomes very slight and this coil does not constitute with its condenser 67 or 69, a filtering circuit; the signaling current can then circulate freely in the coil 63 or 65.

The movable member 82 of the galvanometer 74 is conductive and cooperates with a contact piece 83 suitably located. These parts 82 and 83 are interposed in an auxiliary circuit which comprises the following members: A source of electricity 84, a conductor 85, a warning device 86, a conductor 87, a relay winding 88, a conductor 89, the contact piece 83, the movable member 82, a conductor 90, a relay winding 91 and a conductor 92 terminating at the source 84.

The movable armature 93 of the relay winding 88 is connected to the commutator 72, which is, on the other hand, brought back by a weight 94.

The movable armature 95 of the relay winding 91 is connected by a conductor 96 to the conductor 89, and on the other hand this movable armature cooperates with a contact piece 97 which is directly connected to the conductor 90.

Finally, on the running rails 10 there are provided insulated sections respectively indicated by 98 and 99, which are connected by conductors 100 and 101 to the conductors 90 and 92. An electric connection 102 is established on the running rails 10 on each side of the sections 98 and 99.

The operation of the simplified device described above is as follows:

When the locomotive runs on the rails 10, the dynamo 23 driven by the wheels produces an electromotive force proportional to the speed of the locomotive and owing to the conductors 21 and 75

22, the winding 26 imparts to the generator 15 an excitation proportional to the speed of the locomotive.

The source of current 17 supplies, through the conductors 18 and 19, the motor 16, which rotates the generator 15 at constant speed.

Under these conditions, the generator 15 produces an electromotive force of constant frequency but of a value proportional to the speed of the locomotive.

The generator 15 supplies, through the conductors 27 and 28, the primary 29 of a transformer the secondary 30 of which is inserted in the following circuit:

Secondary 30, conductor 32, filter circuit 33, 34 conductor 35, and from the junction point 36 the circuit is divided into two branches.

*First branch.*—Conductor 39, primary of the transformer 40, brush 14, portion 103 of the trolley wire 11.

*Second branch.*—Conductor 37, primary 38 of the transformer, brush 13, trolley wire 11.

To the right of the following track apparatus the circuit is completed as follows:

Trolley wire 11, conductor 59, filter circuit 60, 61, conductor 62, self-induction coil 63, conductor 64, rails 10, wheels 12 of the locomotive, conductor 31 and secondary 30.

The value of the current supplied by the secondary 30 depends, on the one hand, upon the electromotive force of the generator 15, and, on the other hand, upon the resultant impedance of the circuit. Nevertheless, the principal portion of this impedance is located in the trolley wire 11 between the locomotive and the track apparatus and as this impedance is proportional to the length of the trolley wire, it will be understood that, other things being equal, the value of the current depends upon the speed of the locomotive and the distance between this locomotive and the track apparatus.

In other words, this current will be all the greater the greater the speed of the locomotive and the nearer this locomotive is to the track apparatus.

Where the track apparatus is in front of the locomotive as it is supposed in Figure 1, the current does not divide exactly into two equal parts between the two branches 37 and 39 dealt with above. Actually the first branch comprises the portion 103 of the trolley wire, and its impedance is greater than the impedance of the other branch.

The result is that the primary 40 is excited less than the primary 38, which causes a differential effect on the member 50.

Consequently, the movable member 50 of the galvanometer is impelled to a greater extent towards the contact piece 53 and this all the more the greater the speed of the locomotive and the nearer this locomotive is to the track apparatus.

When the current produced by the generator 15 attains the maximum value to which the device is adjusted, the movable member 50 comes into contact with the terminal 53 and the following circuit is closed:

Current source 17, conductor 54, movable member 50, contact piece 53, conductor 55, indicator 57, conductor 58 and source of current 17.

The driver of the locomotive is then advised of the presence in front of him of a track apparatus in the closed position.

The current produced by the generator 15 of the locomotive thus circulates as stated above, in the self-induction coil 63 of the track apparatus.

Thus, the passage of this current causes in the secondary 66 a certain electromotive force which, consequently is itself also proportional to the speed of the locomotive and inversely proportional to the distance away of this.

This electromotive force produces a current in the following circuit:

Secondary 66, conductor 70, contact piece 71, switch or commutator 72, conductor 73, galvanometer 74, conductor 75 and secondary 66.

Thus, the movable member 82 of the galvanometer 74 deflects and when the locomotive is sufficiently near, the current has become such that this member 82 comes in contact with the terminal piece 83 and the following circuit is then closed:

Source of current 84, conductor 85, warning device 86, conductor 87, winding 88, conductor 89, contact piece 83, movable member 82, conductor 90, winding 91, conductor 92 and source of current 84.

The alarm 86 operates which shows the attendant that a train is about to arrive.

Furthermore, the winding 91 is excited and attracts the armature 95, which produces, owing to the conductor 96 and contact piece 97, a permanent short-circuit between the conductors 89 and 90.

Thus, if the movable member 82 then leaves the contact piece 83, the preceding circuit nevertheless remains closed.

Finally, owing to the closing of this circuit, the winding 88 is excited and attracts the armature 95 which brings the change-over switch 72 into contact with the terminal 77.

The circuit in which is the secondary winding 66 is then opened, the coil 63 has now a normal coefficient of self-induction and as this coil is connected in parallel to the condenser 67 it forms with it an absolute block to the signaling current.

On the other hand, the following circuit is now formed:

Secondary 68, conductor 76, contact piece 77, commutator 72, conductor 73, galvanometer 74, conductor 75, filter circuit 79—80, conductor 81 and secondary 68.

This circuit being closed, the coil 65 becomes very low in its coefficient of self-induction, and the condition of resonance is no longer fulfilled with respect to the condenser 69. Thus, the signaling current which is blocked by the circuit 63, 67 can pass freely into the following section 11' of the trolley wire.

This section 11' obviously terminates at a following track apparatus and the result is that the resulting impedance of the circuit into which passes the secondary 30 of the locomotive increases to a point such that the signaling current becomes relatively feeble and the indicator 57 does not give any warning to the locomotive driver adapted to cause him to reduce the speed.

During this time the alarm 86 functions continuously, but when the wheels 12 of the locomotive come to the right of the rail sections 98 and 99 these sections are connected electrically in such manner that a true short-circuit is produced, through the intermediary of the conductors 100 and 101, at the terminals of the winding 91.

This winding 91 no longer receiving current, the armature 95 leaves the contact 97 cutting out the alarm circuit 86 and the winding 88.

The alarm 86 ceases to function and, under the action of the weight 94, the change-over switch 72 returns to its initial position shown on Figure 75

1, after which the circuit into which the secondary 66 eventually feeds, is closed.

In this position, the secondary circuit 68 being open, the self-induction coil 65 and the condenser 69 act as a stopper circuit for the signaling current. On the other hand, the coil 63 now only possesses a feeble coefficient of self-induction in such manner that the whole signaling current passes through the conductor 64. Thus the track apparatus is in the initial position ready to take the following locomotive.

The locomotive which has just passed the track apparatus cannot be influenced by this return into an effective condition of the track apparatus, and this for the reason of the presence of the stopper circuit 65, 69, but even if this circuit did not exist the equipment of the locomotive is such that there is no risk of the locomotive being obliged to slow down for any position whatever of a track apparatus which it has just passed.

Actually in this case the current would be directed towards the rear part of the locomotive so that the portion 103 of the trolley wire would be traversed by the current which supplies the primary 38 and this current would be less than that of the primary 41. Consequently, the movable member 50 of the differential galvanometer 45 would not be urged towards the contact piece 53 and the driver of the locomotive has not to reduce speed.

When the current in the circuit becomes zero, the member 50 comes into contact with the contact piece 52 which closes the following circuit:

Current source 17, conductor 51, member 50, contact piece 52, conductor 54, indicator 56, conductor 58 and current source 17.

Thus, when the signaling circuit is interrupted by accident or when there is in front of the locomotive another locomotive running strictly at the same speed, the indicator 56 functions and the locomotive driver is warned.

The equipment of the locomotive and of the track apparatus shown on Figure 1 and described above, is simplified particularly and Figures 2 and 3 show a more complete representation of the normal equipment respectively of a locomotive and of a track apparatus, for example, of a level crossing with movable barriers.

Figure 2:
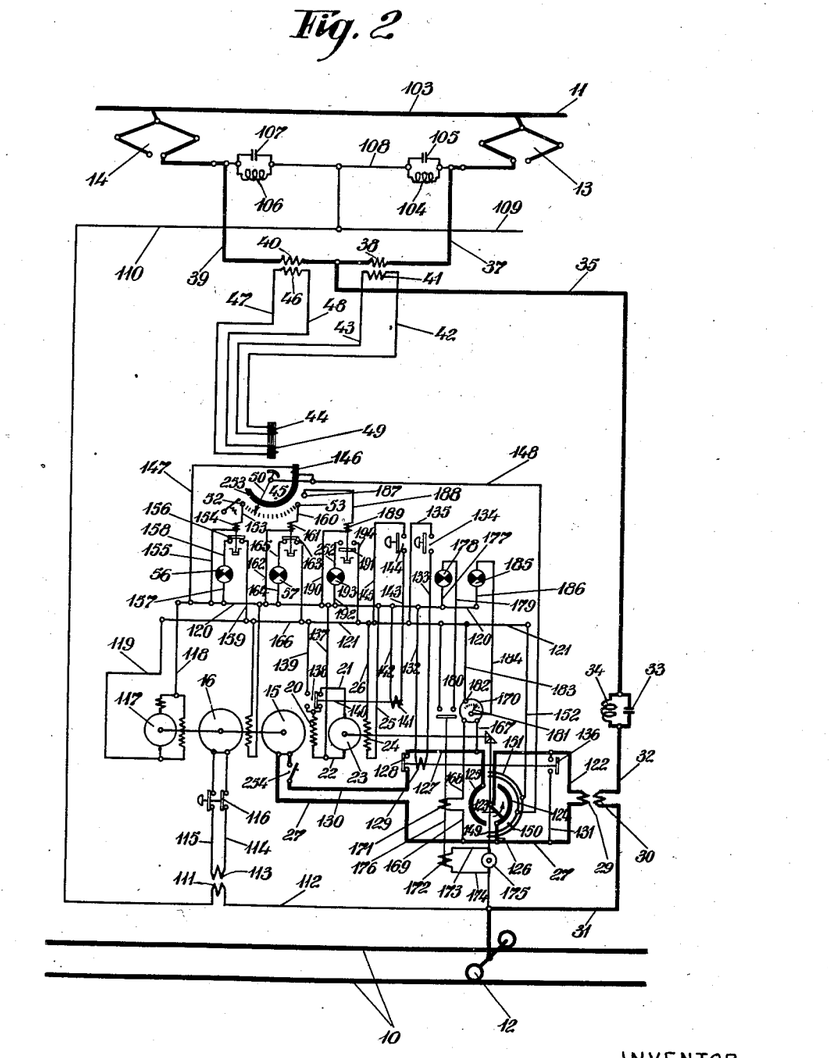
Figure 2 is a more complete diagram of the equipment on a locomotive.

On Figure 2, the rails are shown by 10, the trolley wire by 11, the locomotive wheels by 12, and the collecting brushes by 13 and 14. Between these brushes there is now shown the collection of the traction current comprising after the brush 13, a self-induction coil 104 and a condenser 105, arranged so as to form a stopper circuit for the signaling current. In the same way, a similar stopper circuit 106, 107, is connected to the brush 14.

The two stopper circuits are connected by a conductor 108 which terminate a conductor 109 coming from the traction machine and a conductor 110 coming from the primary 111 of an auxiliary transformer connected by a conductor 112 to the wheels 12 of the locomotive.

The secondary 113 of this transformer feeds by means of conductors 114 and 115 and through a switch 116, the motor 16 which produces the rotation of the generator 15 of the signaling current.

The motor 16 is preferably of the synchronous type owing to which the speed of rotation of the generator 15 will be strictly constant and the frequency of the signaling current will itself remain constant.

By unifying over all the locomotives, the reciprocal arrangement of the motor 16 and of the generator 15, the signaling currents produced by these locomotives will always be in phase agreement.

The motor 16 also drives a continuous current dynamo 117 called the "exciter". This dynamo is intended to produce the current necessary not only for the excitation of the motor 16 and of the tachometrical dynamo 23 but also for the control apparatus and the warning indicators. The dynamo 117 thus plays the part of the source 17 described with respect to Figure 1.

To this end, the terminals of the dynamo 117 are connected respectively by conductors 118 and 119 to two bus bars 120 and 121 to which are attached all the conductors of the apparatus using the continuous current of dynamo 117.

In the same way as on Figure 1, the brush 13 is connected to a circuit branch 37 comprising a transformer 38, 41 and cooperating with the brush 14 is the circuit branch 39 and the transformer 40, 46.

The secondaries 41 and 46 of these transformers are connected as previously to the differential windings 44, 49 of a galvanometer 45 through conductors 42, 43 and 47, 48 respectively.

As previously, the branch circuits 37 and 39 terminate at a conductor 35 which through a filter circuit 33, 34, passes through a conductor 32 terminating at the secondary 30 of a transformer. A conductor 31 connects the other terminal of this secondary to the wheels 12 of the locomotive.

Nevertheless, the primary 29 of this transformer is connected directly by a conductor 27 to a terminal of the signaling current generator 15, the other conductor 122 starting from the primary 29 terminates at the movable brush 123 of a commutator driven by the wheels 12 of the locomotive.

The movable brush 123 cooperates with two fixed contacts 124 and 125 in such manner as to come alternately into contact with them. The fixed contact piece 124 extends over slightly less than half a revolution and is connected permanently, through a conductor 126 to the conductor 27. Thus, when the movable brush 123 is in contact with the contact piece 124, the primary 29 of the transformer is short-circuited.

The fixed contact piece 125, also extending over a little less than half a revolution, is connected to the generator 15 by a conductor 127, the movable armature 128 of a relay 129, a conductor 130 and a switch 254.

The relay 129 comprises another armature 136 interposed in a conductor 131 which connects the conductor 122 to the conductor 27.

The armatures 128 and 136 are integral, so that only one at a time is in the closed position.

The relay 129 is connected on one hand by a conductor 132 to the bus bar 120, and on the other hand by a conductor 133, a switch 134 and a conductor 135 to the bus bar 121.

As previously, the exciting member 20 of the generator 15 is normally supplied by a tachometrical dynamo 23 driven by the wheels 12 of the locomotive. This tachometrical dynamo is itself excited by a winding 24 connected by conductors 25 and 26 to the bus bars 120 and 121.

Nevertheless, one of the terminals of the exciting member 20 is connected permanently through a conductor 137 to the bus bar 120 and the other terminal leads to a change-over switch 136 connected by a conductor 139 to the bus bar 121.

Furthermore, the movable member 140 of the switch 138 is acted upon to connect, according to its position, this terminal of the exciting member 20 either to the tachometrical dynamo 23 or to the bus bar 121, that is to say, to the exciter dynamo 117.

The movable member 140 of this switch is controlled by a relay 141 of which one terminal is connected by a conductor 142 to the bus bar 120 and the other terminal by a conductor 143 to a switch 144 itself connected by a conductor 145 to the bus bar 121.

In shunt between the conductors 127 and 27, that is to say, in shunt on the terminals of the signaling current generator 15, are connected through the conductors 167, 168 and 169 a voltmeter 170 and a winding of the differential relay 171 arranged in series.

The other winding 172 of the differential relay is supplied through conductors 173 and 174 by an electric tachometer 175 driven by the wheels 12 of the locomotive.

The movable armature 176 of the differential relay 171, 172 controls the opening or the closing of a circuit comprising the bus bar 120, a conductor 177, an indicator or alarm 178, a conductor 179, the armature 176 a conductor 180 and a bus bar 121.

The movable member 181 of the voltmeter 170 is conductive and cooperates with a fixed contact piece 182, connected to the bus bar 121 by a conductor 183, whilst the movable member 181 is connected by a conductor 184 to an alarm indicator 185 connected by a conductor 186 to the bus bar 120.

The galvanometer 45 comprises a holding electromagnet 146 having a fixed core 253 is connected on the one hand by a conductor 147 to the bus bar 120 and, on the other hand, to a conductor 148 coming from the movable member 50 of the galvanometer. The conductor 148 terminates at a fixed contact piece 149 with which cooperates a brush 150 integral with the brush 123 described above.

The brush 150 is adapted in its passage to place in short-circuit the contact piece 149 with a contact piece 151 connected by a conductor 152 to the bus bar 121.

The contact pieces 149 and 151 extend over approximately half a revolution and are arranged in such manner as to be placed in short-circuit by the brush 150 during the whole time in which the brush 123 is in contact with the contact piece 124.

As previously, the movable member 50 of the galvanometer 45 is conductive and is adapted to come into contact in the course of its deflection with fixed contact pieces 52 and 53.

The fixed contact piece 52 presumed as located in the vicinity of the origin of the travel of the movable member 50 is connected by a conductor 153 to a winding of the relay 154 which is connected by a conductor 155 to the bus bar 120.

The armature 156 of the relay 154 controls the opening or the closing of a circuit comprising the bus bar 120, a conductor 157, the indicator or alarm 56, a conductor 158, the armature 156, a conductor 159, and the bus bar 121.

The contact piece 53 arranged in the vicinity of the maximum deflection of the movable member 50, is connected by a conductor 160 to a winding of the relay 161 connected by a conductor 162 to the bus bar 120.

The armature 163 of the relay 161 is inserted in a circuit comprising the bus bar 120, a conductor 164, the indicator or alarm 57, a conductor 165, the armature 163, a conductor 166 and the bus bar 121.

The differential galvanometer 45 comprises a third contact piece 187 adapted to be contacted by the movable member 50 just at the end of its deflection travel. The contact piece 187 is connected by a conductor 188 to a relay winding 189, itself connected by a conductor 190 to the bus bar 120.

The movable armature 191 of the relay 189 is inserted in a circuit which comprises a conductor 192, an indicator or alarm 193, a conductor 252, the movable armature 191, a conductor 194 and the bus bar 121.

Generally, the members which have just been described operate essentially as has been described with respect to Figure 1; nevertheless, the equipment is actually completed by a certain number of auxiliary devices the role of which will be explained hereafter.

When the locomotive is running, the rotating commutator 123—150 operates at a cadence proportional to the speed of the locomotive. When the brush 123 is in contact with the contact piece 125, the primary 29 is placed in communication by the conductors 27, 122, 127 and 130 with the signaling current generator 15 in such manner that a certain signaling current is sent by the locomotive towards the following track apparatus. The galvanometer 45 is influenced more strongly the greater the speed of the locomotive, and the nearer it is to the obstacle.

When the brush 123 of the commutator is in contact with the fixed contact piece 124, the primary 29 is short-circuited and consequently the impedance of the secondary 30 becomes zero. Thus, if behind the locomotive there is another approaching locomotive, the signaling current produced by this locomotive and received by its indicator or alarm apparatus will be inversely proportional to the space between the two locomotives and no dangerous approach can take place.

Furthermore, during the same period, the brush 150 places in short-circuit the fixed contact pieces 149 and 151 so that by means of the conductors 147, 148 and 152, the circuit of the electromagnet 146 of the galvanometer 45 is closed and the magnetic field produced by this electromagnet causes the movable member 50 to remain stationary in the position which it occupied when the brush 123 was in contact piece 125.

Due to this arrangement, the movable member 50, in so far as it is restrained in its movement of return to zero, occupies a position corresponding to the maximum value of the current even if the period over which the maximum lasts is very short.

When another locomotive or a closed track apparatus is in front on the track at a definite distance according to the speed of the locomotive, the movable member 50 of the galvanometer 45 is thus arrested on the contact piece 53. The following circuit is then closed:

Bus bar 121, conductor 152, fixed contact pieces 151 and 149, brush 150, conductor 148, movable member 50, contact piece 53, conductor 160, winding 161, conductor 162 and bus bar 120.

The winding 161 is then excited and attracts the armature 163 which opens the following circuit:

Bus bar 120, indicator 57, conductor 165, armature 163, conductor 166, bus bar 121.

The result is that the indicator 57 is no longer supplied and the driver of the locomotive is thus advised that there is an obstacle in front of him and that its distance is such that the locomotive must be slackened in speed and stopped if necessary.

If one of the circuit branches 37 or 39 were opened, the deflection of the movable member 50 would be a maximum. It would touch the contact piece 187 which would release the operation of the alarm 193.

As regards the indicator 56, this obviously functions under the same conditions as described in connection with Figure 1.

On the example shown, it has been supposed that the indicators 56 and 57 are operated by opening the circuit and that the alarm 193 is operated by closing the circuit, but it is evident that this is not obligatory and that the types of relays may be different from those shown.

If, for any reason, the alternating current generator 15 does not work properly, the electromotive force which it produces is no longer in relation with that of the electric tachometer 175. The result is that the magnetic effects of the windings 171 and 172 on the armature 176 are no longer in equilibrium and the armature 176 closes the circuit comprising the indicator 178 and the conductors 177, 179 and 180. Thus the indicator 178 operates and warns the driver.

If even the electromotive force of the generator 15 becomes zero, the movable member 181 of the voltmeter 170 would return to zero and, by touching the contact piece 182, it would close the circuit comprising the indicator 185 and the conductors 183, 184 and 186 so that the driver would be advised of this occurrence.

This arises if an accident occurs to the tachometric dynamo 23 or again if the locomotive is stationary. In both cases, the driver operates the switch 144 which has for effect to close the circuit comprising the conductors 142, 143 and 145 and the winding 141.

The movable armature 140 is displaced and by the play of the commutator 138, the exciting member 20 of the alternator is separated from the tachometric dynamo 23 and connected by the conductors 137 and 139 to the bus bars 120 and 121.

Thus, the excitation of the generator 15 becomes constant and the signaling circuit remains supplied with a potential which is reduced but is sufficient for the driver to be advised when the track apparatus or the train in front are in such a position that the locomotive can start.

If the tachometric dynamo 23 is out of action, the locomotive can continue its course at a reduced speed, signaling its approach and without risking accidents.

When the driver acts upon the switch 134, the circuit comprising the following members is closed:

Bus bar 120, conductor 132, winding 129, conductor 133, switch 134, conductor 135, bus bar 121.

The winding 129 is excited and moves its armature 128, 136.

The part 128 leaves its contact pieces and the part 136 moves on to its contact pieces. The result is that the circuit supplied by the signaling current generator 15 is opened, whilst the primary 29 is short-circuited by the conductor 122, the armature 136, the conductor 131 and the conductor 27.

Thus, the locomotive acts as a permanent short-circuit between the trolley wire 11 and the running rails 10 except obviously for the traction current the passage of which is prevented by the filter 33, 34.

This manipulation of the switch 134 by the driver has for its object to find out whether the obstacle, the presence of which on the track has brought the movable member 50 of the galvanometer 45 on to the fixed contact piece 53, is a running train or a track apparatus.

Actually in the first case, current circulates in the signaling circuit and the movable member 50 of the galvanometer 45 retains a deflection which is not zero.

In the second case, no current generator acts in the circuit and the movable member of the differential galvanometer 45 comes into contact with the contact piece 52, which closes the following circuit:

Bus bar 121, conductor 152, contact pieces 149, 151 conductor 148, movable member 50, contact piece 52, conductor 153, winding 154, conductor 155 and bus bar 120.

The winding 154 is then excited and attracts the armature 156 which breaks the electric connection between the conductors 158 and 159 and causes the operation of the indicator 56.

Thus advised, the driver again opens the switch 134 and continues running taking into account the situation which has been discovered.

Figure 3:
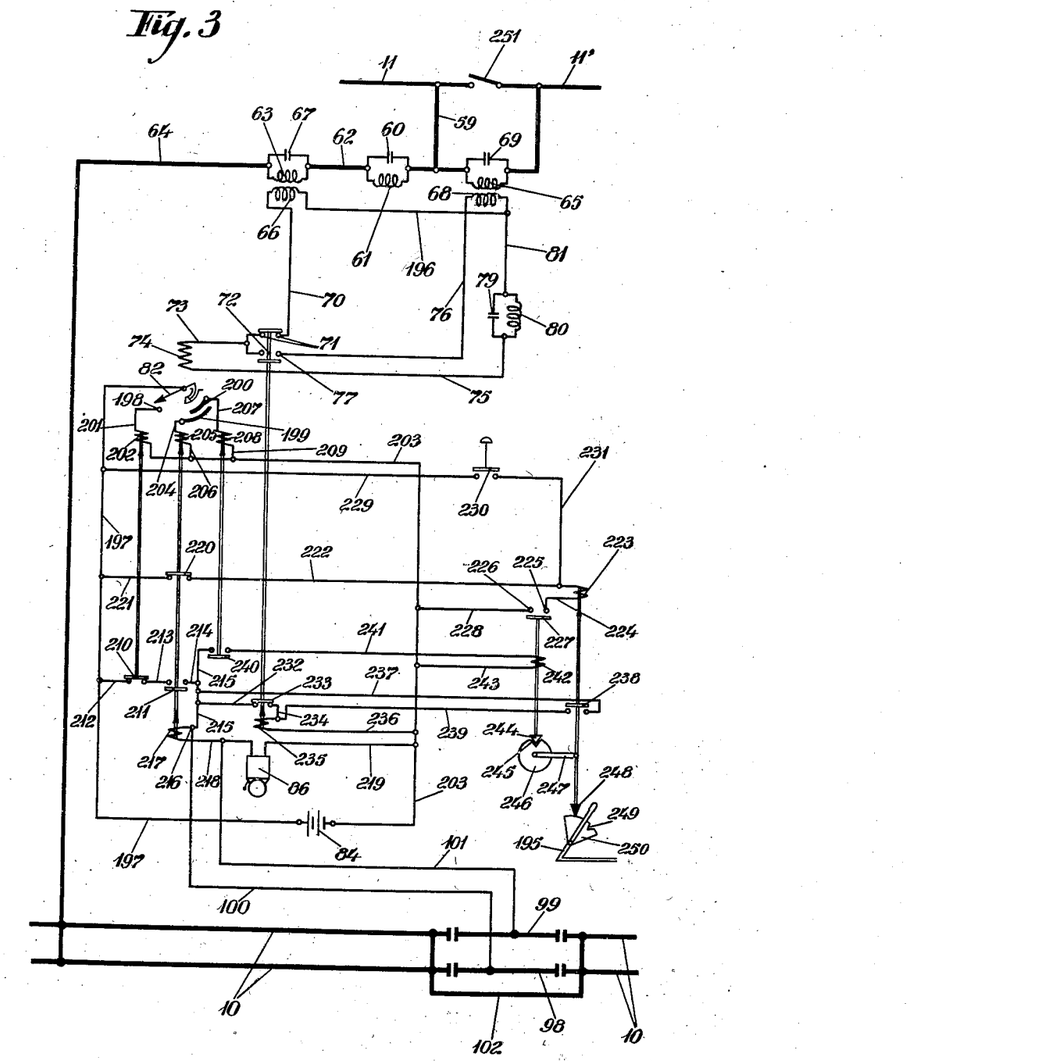
Figure 3 illustrates the connections of a track apparatus for giving a warning and locking a level crossing barrier.

Figure 3 shows the diagram of a track apparatus with a device for signaling and the locking of a level crossing barrier, the manipulating lever of which is shown by 195.

On this figure, there is furthermore seen a certain number of members already described for the simplified track apparatus shown in Figure 1. In particular the running rails 10, the trolley line 11 with its extension 11' towards the following track apparatus.

As previously, the trolley line 11 is connected to the running rails 10 by the following members: Conductor 59, filter tuned to the traction current 60—61, conductor 62, self-induction coil 63 and conductor 64.

The coil 63 co-operates on the one hand with a condenser 67 so as to form a filter tuned to the frequency of the signaling current and, on the other hand, with a secondary 66 in such a manner as to form a kind of transformer.

In the same way, there is interposed between the parts 11 and 11' of the trolley line, a self-induction coil 65 co-operating with a condenser 69 and a secondary 68 under the same conditions as those shown above with respect to the coil 63, the condenser 67 and the secondary 66.

As previously, the secondary 68 acts in the circuit comprising a conductor 76, contact pieces 77, co-operating with a change-over switch 72, a conductor 73, the winding of a galvanometer 74, a conductor 75, a filter 79, 80 tuned to the frequency of the traction current, and a conductor 81.

The secondary 66 is inserted in a circuit which comprises a conductor 70, contact pieces 71, the change-over switch 72, the conductor 73, the winding of the galvanometer 74, the conductor 75, the filter 79, 80, the conductor 81 and a conductor 196.

It is easy to see that according to the position of the change-over switch 72, it will be one or the other of the secondaries 66 or 68 which acts on the galvanometer winding 74.

The movable member 82 of this galvanometer is a current conductor and is permanently connected by a conductor 197 to one of the poles of a source of current 84.

The movable member 82 co-operates with three contact pieces indicated respectively by 198, 199 and 200. The contact piece 198 has a very small angular extent and is arranged to be contacted by the movable member 82 when the latter is in the vicinity of its zero deflection.

When the member 82 is in contact with the contact piece 198, the following circuit is closed:

Source of current 84, conductor 197, movable member 82, contact piece 198, conductor 201, relay winding 202, conductor 203 and source of current 84.

When the movable member 82 of the galvanometer is in contact with the contact piece 199, the following circuit is closed:

Current source 84, conductor 197, movable member 82, contact piece 199, conductor 204, relay winding 205, conductor 206 and 203, current source 84.

The contact piece 199 has a considerable angular extent, so that it is contacted by the moving member 82 when the latter has reached approximately one-half its deflection and the contact between the contact piece 199 and the moving member 82 is maintained up to the full extent of its deflection.

The contact piece 200 however itself also possesses a considerable angular extent and the moving member 82 is arranged to be able to come into contact both with the two contact pieces 199 and 200 over the whole extent of this latter contact piece.

When the moving member 82 has reached the contact piece 200, the following circuit is closed:

Current source 84, conductor 197, moving member 82, contact piece 200, conductor 207, relay winding 208, conductors 209 and 203, and current source 84.

The movable armature 210 of the relay 202 and an element 211 of the movable armature of the relay 205, are inserted in the following circuit:

Source of current 84, conductor 197, conductor 212, armature 210, conductor 213, armature 211, conductors 214, 215 and 216, relay winding 217, conductor 218, alarm 86, conductors 219 and 203, current source 84.

The relay winding 217 acts on the same armature and in the same sense as the winding 205, that is to say, that when this winding 217 is excited, the armature 211 remains in the closed position even if the winding 205 ceases to be excited.

Another armature element 220 is integral with the element 211 and is inserted in the following circuit:

Current source 84, conductors 197 and 221, armature 220, conductor 222, relay winding 223, conductor 224, contact pieces 225 and 226 co-operating with an armature 227, conductors 228 and 203, current source 84.

In parallel to the armature 220 there is provided the following branch between the conductor 197 and the conductor 222.

Conductor 229, hand switch 230 and conductor 231.

Between the conductors 215 and 203 is inserted the following branch:

Conductor 232, armature 233, conductor 234, relay winding 235 and conductor 236.

Between the conductors 215 and 234 is also arranged the following branch:

Conductor 237, armature 238 of the relay 223 and conductor 239.

As regards the armature 240 of the relay 208, this is inserted in the following circuit:

Current source 84, conductors 197 and 212, armature 210, conductor 213, armature 211, conductors 214 and 215, armature 240, conductor 241, relay winding 242, co-operating with the armature 227, conductors 243 and 203, current source 84.

The armature 227 is integral with a bolt 244 co-operating with a notch 245 provided in a disk 246 connected by a crank arm 247 to the armature 238 of the relay 223.

The armature 238 is also integral with a bolt 248 co-operating with a notch 249 provided in a sector 250 integral with the manipulating lever 185.

As previously, there are provided on the running rails 10, two sections of insulated rails 98 and 99 connected respectively by conductors 100 and 101 to the conductors 216 and 218 situated on each side of the relay winding 217. A direct electric connection 102 joins the rails 10 on each side of the sections 98 and 99.

Finally, an ordinary cut-out switch 251 is located between the two sections 11 and 11' of the trolley wire. When this switch 251 is closed, these sections 11 and 11' are directly connected and obviously no current can pass into the coil 65.

The parts being in the position shown by Figure 3, it may be supposed that a locomotive arrives. The circuit into which the secondary 68 feeds is open and the result is that the coil 65 has a normal coefficient of self-induction and due to the condenser 69 it constitutes a stopper circuit for the signaling current.

This current is not stopped by the filter 60—61 which is only tuned to the frequency of the traction current. Thus the coil 63 is excited and, by induction, the secondary 66 feeds into its circuit a current proportional to the signaling current and having the same frequency.

The filter 79—80 tuned to the frequency of the traction current does not constitute an obstacle to the passage of this secondary signalling current, so that the winding of the galvanometer 74 is excited and the moving part 82 deflects.

As the locomotive approaches, the current progressively increases and the same applies to the deflection of the moving member 82.

This moving member first encounters the contact piece 198, but the action which results therefrom is, for the moment, of no importance.

When the intensity of the current attains the value determined for causing the approach of the locomotive to be advised, the moving member comes into contact with the contact piece 199 which excites the relay 205 and displaces the double armature 211—220.

An electric connection is established between the conductors 213 and 214, so that the alarm 86 operates and at the same time the winding 217 is excited and thus the armature 211 remains in the position which it occupies even if the movable member 82 left the contact piece 199, for example in the case of stoppage of the locomotive.

At the same time, the branch 232, 235, 236 is traversed by a current so that the excited relay 235 simultaneously moves the armatures 233 and the change-over switch 72.

As the armature 233 forms part of the exciting circuit of the winding 235, it immediately drops and then rises and this armature commences to oscillate as well as the change-over switch 72.

The result is that the secondaries 66 and 68 are alternately placed in circuit with the galvanometer 74 and at the same cadence the signaling current will pass either into the conductor 64 and the running rails 10 or into the section 11' of the trolley wire up to the following track apparatus.

It is due to these oscillations of the change-over switch 72 that the locomotive which approaches can signal its arrival to the track apparatus located beyond the one under consideration.

If the signaling current continues to increase owing to the approach of the locomotive, the movable member 82 reaches the contact piece 200. The relay winding 208 is excited, the armature 240 is attracted and an electric connection is established between the conductors 215 and 241.

The winding 242 is then excited and it displaces simultaneously the armature 227 and the bolt 244.

The disk 246 is freed and there are then two cases to be considered:

1st case: The level crossing barrier is open and the lever 195 is in the position shown on Figure 3.

The bolt 248 rests on a smooth part of the sector 250 and the armature 238 of the relay 223 remains stationary in spite of being unfastened. Thus the change-over switch 72 continues to oscillate and the locomotive which has caused this operation is forced to stop, since the signaling current pases through the direct connection 64 and increases more and more.

2nd case: The level crossing barrier is closed and the lever 195 is in the corresponding position, that is to say, that the notch 249 is under the bolt 248.

As the armature 238 has been liberated by the bolt 244, the bolt 248 drops into the notch 249 and consequently the lever 195 can no longer be manipulated, and it is impossible for anyone to accidentally open the level crossing barrier.

Furthermore, an electric connection is established by the armature 238 between the conductors 237 and 239.

Thus in order to supply the relay winding 235, the current need no longer pass through the intermittent contact formed by the armature 233 and owing to the permanent operation of the relay 235 the change over switch 72 becomes stationary in the upper position according to which the secondary 68 is in circuit.

Thus the inductance between the sections 11 and 11' of the trolley wire becomes very feeble and the signaling current is directed towards the following track apparatus.

The present track apparatus does not influence in any way the indicators of the locomotive and the latter can pass it without having to slow down. This is normal since the lever 195 is in the correct position and the barrier is closed.

As soon as the locomotive passes the track apparatus, it clears the sections of insulated rails 98, 99 and the wheels of the locomotive thus place the winding of the relay 217 in short-circuit through the conductors 100 and 101.

The double armature 211, 220 of this relay therefore drops so that in the first place the electric connection is ensured between the conductors 221 and 222.

The following circuit is then closed:

Current source 84, conductors 197, 221, armature 220, conductor 222, relay winding 223, conductor 224, contact-piece 225, armature 227, contact piece 226, conductors 228 and 203, current source 84.

The relay winding 223 being excited the bolt 248 is raised, permitting the free control again of the barrier by means of the lever 195.

On rising, the bolt 248 causes the disc 246 to rotate and the notch 245 comes under the bolt 244.

As the relay 242 is not excited since the movable member 82 is no longer in contact with the contact piece 200, the bolt 244 drops immediately into the notch and fixes the disc 246. At the same time the armature 227 leaves the contact pieces 225 and 226 and the relay 223 is no longer excited, but the bolt 248 remains fixed since it is itself held stationary by the bolt 244.

At the same time the armature element 211 cuts off the electric connection between the conductors 213 and 214, thus the operation of the alarm 86 is interrupted and the relay 235 is no longer excited. The commutator 72 returns to its position of rest as shown in Figure 3.

The attendant can then open the level crossing barrier as the track apparatus has taken up its initial state and is ready to operate afresh.

If after having signaled its arrival, the train had stopped or had slowed down sufficiently, the movable member 82 would have dropped to the zero point of its deflection placing itself in passing in contact with a contact piece 198.

The relay 202 would have been immediately excited and the displaced armature 210 would have interrupted the electric connection between the conductors 212 and 213. This closing would have caused, as previously, the stoppage of the alarm 86 and the unlocking of the lever 195 controlling the barrier.

The hand control switch 230 is intended to permit the relay 223 to be excited even if the movable member, being on the contact piece 199, has caused the opening of the ordinary exciting circuit of this winding 223. This permits the attendant to manipulate the barrier under exceptional circumstances even if a train is approaching.

It is to be noted that when carrying out this exceptional manipulation the attendant causes the exciting circuit of the relay 235 to be cut, since the armature 238 is raised and thus even if the train continues to approach, the change-over switch 72 remains stationary in the position of Figure 3 and the indicators of the locomotive warn the driver that the track apparatus must not be passed.

Obviously it would be easy to imagine the different phases of operation of the apparatus where, instead of a barrier controlling a level crossing, it were a matter of controlling a point.

In this case, the sector would have two notches 249 in each of which the bolt 248 could be fixed by the locking of the disc 245.

The contact pieces 199 and 200 have a considerable angular extent, so that the movable member 82 contacts with them, not only for definite values of the signaling current but for all currents equal to or greater than these values.

This is necessary in the cases where two trains follow each other at a comparatively short distance apart.

Actually, when the first locomotive passes on to the section of rails 94 and 99 and brings back all the members to the position of rest, the movable member 82 does not return to zero, since the following train produces a signaling current which is already considerable. It is therefore necessary that at this moment, whatever may be its position, the movable member 82 should be in contact with the contact piece 199 or even the contact piece 200 in order to cause the members of the track apparatus to carry out the movement required by the approach of the train.

This condition is only fulfilled if, as in Figure 3, a considerable angular extension is given to the contact pieces 199 and 200.

It is obvious that what has been described for signaling on railways with alternating current electric traction, applies where the traction would be by continuous current or even by steam if a mixed circulation of electric and steam trains takes place over the track.

Similarly and without thereby departing from the general scope of the invention, there might be used as the generator 15 of constant frequency alternating current any type of suitable apparatus, such as an alternator, commutator, vibrator, generator by thermionic valves or the like.

If in the example described above, it is presumed for the purpose of simplification that the galvanometers mounted on the locomotives made contacts and closed circuits, it is of course understood that in practice the apparatus might be so arranged that they cause, on the contrary, the opening of circuits normally established, this being in order to obtain a strict control of their operation.

I claim:

1. A signaling apparatus for electric railways employing the track rails as part of a signaling circuit, comprising an insulated conductor along the track, means on the track for establishing electrical connection between said rails and insulated conductor, collectors disposed on locomotives running on said track rails and making contact with said conductor, a signal indicating device, an alternating current generator of constant frequency for actuating the indicating device over said collectors, and a direct current dynamo supplying an electromotive force proportional to the locomotive speed, said dynamo energizing the field of said alternating current generator.

2. An apparatus according to claim 1, comprising further an electrical connection between the indicating device and the track rails, a two-way switch on each locomotive operated in rhythm with locomotive speed, said switch periodically cutting out the generator circuit of the locomotive and cutting in said electrical connection, electric braking means operative on the signaling indicator, and an electrical connection between the braking means and said switch over which connection said braking means is energized in the periods when said switch connects the signaling indicator with the rails.

3. A signaling apparatus for electric railways employing the track rails as part of a signaling circuit, comprising an electric power line along the track for supplying traction current, an A. C. signaling generator on each locomotive running on the track, a signal indicating device, brushes on said locomotive contacting the power line to supply signaling current to the latter, track devices including an electrical connection between said rails and power line, and filters in said connection to separate the signaling current from the traction current, said filters including an induction coil having a secondary winding magnetically coupled thereto and so arranged in a circuit including the signal indicator that the induction coil alternatively functions as a filter element and as primary transformer winding when the circuit of the signaling indicator is opened and closed.

RAYMOND ARTHUR TUOT.